April 12, 1966   M. K. ROGERS   3,245,146
SYSTEM FOR RULING MULTIPLE LINES
Filed Jan. 31, 1961   3 Sheets-Sheet 1
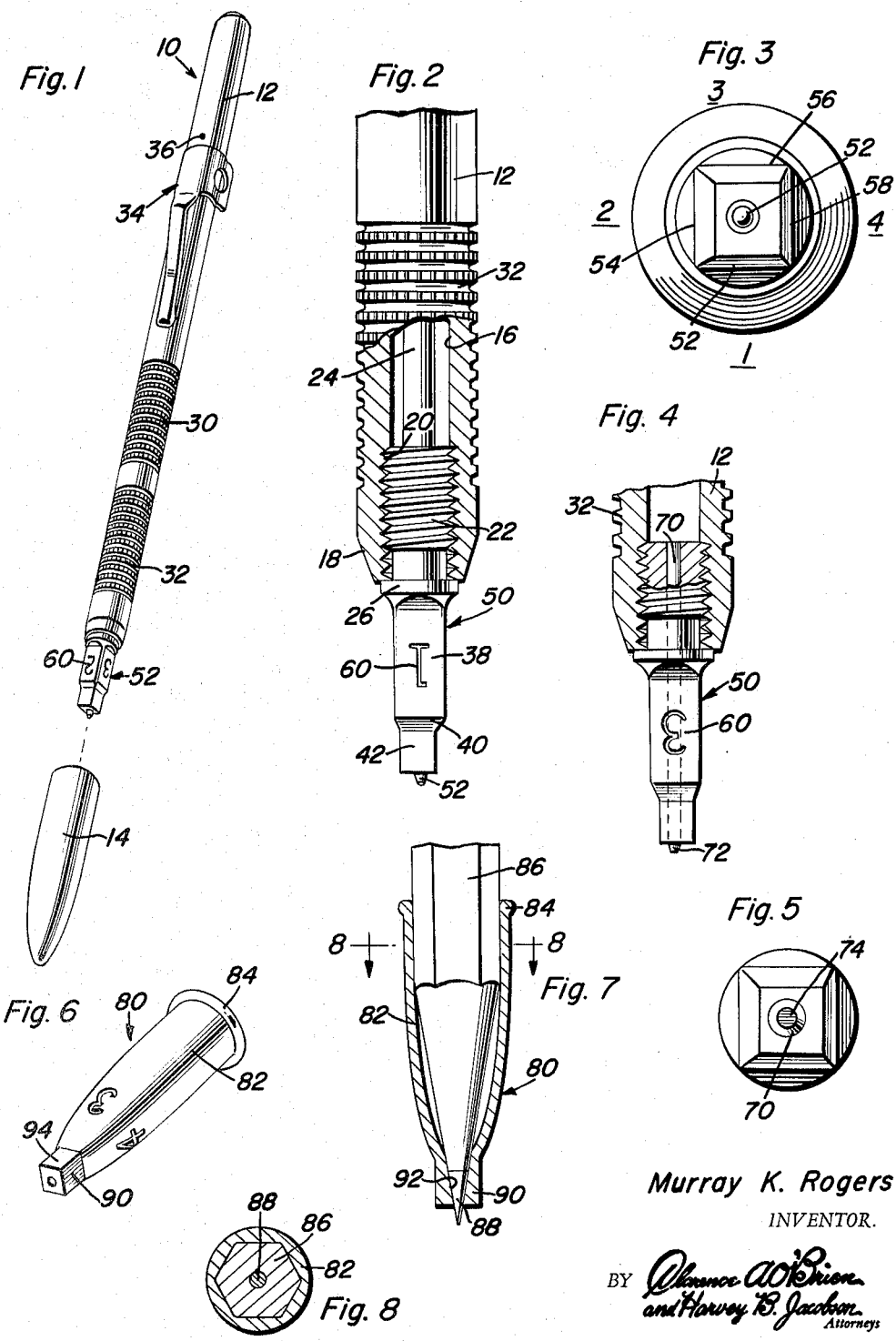
Murray K. Rogers
INVENTOR.

April 12, 1966  M. K. ROGERS  3,245,146
SYSTEM FOR RULING MULTIPLE LINES
Filed Jan. 31, 1961  3 Sheets-Sheet 2
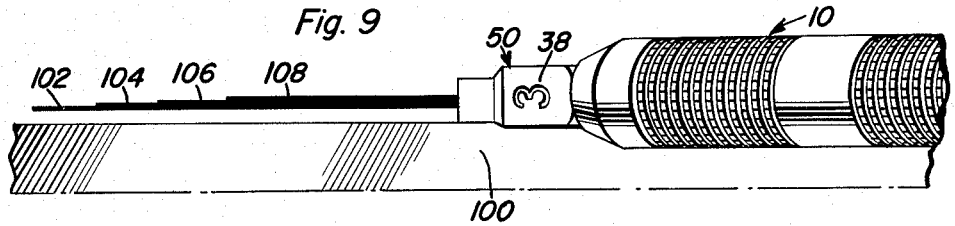
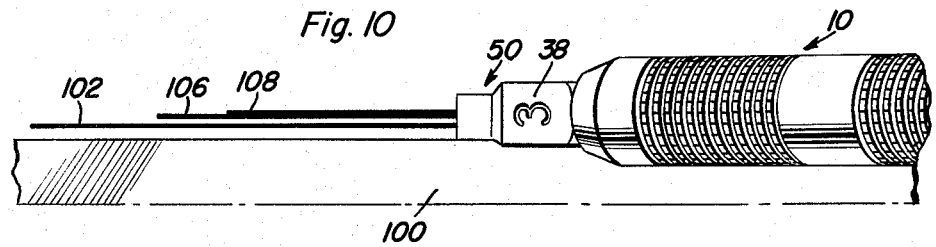
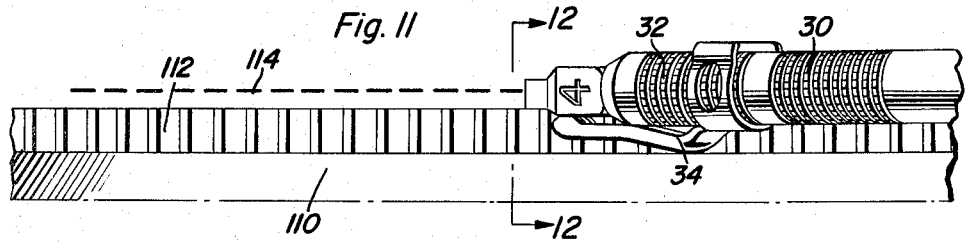
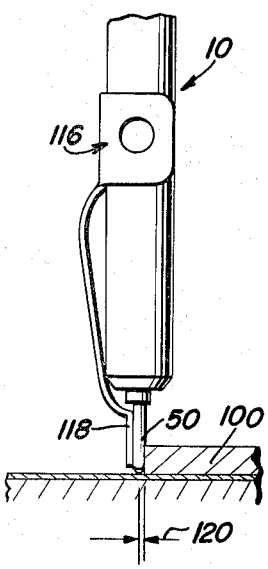 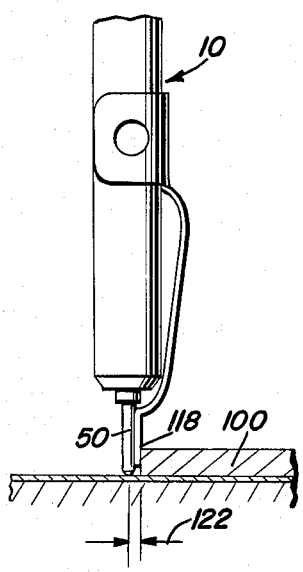 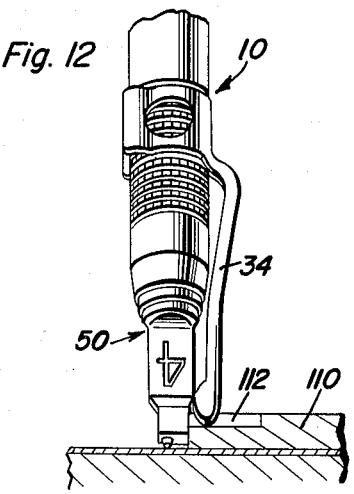
Murray K. Rogers
INVENTOR.
BY *Clarence A. O'Brien*
*and Harvey B. Jacobson*
Attorneys April 12, 1966  M. K. ROGERS  3,245,146
SYSTEM FOR RULING MULTIPLE LINES
Filed Jan. 31, 1961  3 Sheets-Sheet 3

Murray K. Rogers
INVENTOR.

BY
Attorneys

United States Patent Office 3,245,146
Patented Apr. 12, 1966

3,245,146
SYSTEM FOR RULING MULTIPLE LINES
Murray K. Rogers, % Multi-Line Pen Co., P.O. Box 583, Somerset, Ky.
Filed Jan. 31, 1961, Ser. No. 86,120
14 Claims. (Cl. 33—39)

This invention comprises a novel and useful system for ruling multiple lines and more particularly relates to an instrument for the use of draftsmen and others who wish to effect the ruling of various types of lines in varying thickness and in varying spaces between the lines.

Draftsmen and others for various reasons frequently find it desirable to be able to make a number of lines of varying widths and at precisely determined varying spacings from each other. Heretofore it has been customary to form such lines either in a very tedious manner by employing a succession of operations with various implements in order to attempt to form the desired line arrangement in a rather haphazard manner involving considerable guesswork.

It is the primary purpose of this invention to provide a single implement capable of forming single or multiple lines of precisely formed varied thicknesses and at precisely spaced distances from each other.

A further object of the invention is to provide a device in the form of an attachment which can be readily applied to existing types of pencils, pens and the like for obtaining the above-mentioned desired objects.

A still further object of the invention is to provide a device in accordance with the foregoing object which will enable the user to readily perform broken or dotted lines or wavy lines while achieving the above desired precision as to thickness and spacing of the lines.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one embodiment of an implement in accordance with this invention for attaining the objects of this invention;

FIGURE 2 is an enlarged detail in elevation of a portion of the implement of FIGURE 1, parts being broken away and shown in vertical section;

FIGURE 3 is an end elevational view of the marking or scribing end of the implement of FIGURES 1 and 2 and taken upon an enlarged scale;

FIGURE 4 is a view similar to FIGURE 2 but showing a scriber employed as the marking implement in the device of FIGURE 1;

FIGURE 5 is an end elevational view of the scriber of FIGURE 4 taken upon an enlarged scale;

FIGURE 6 is a perspective view of an attachment which may be readily applied to a pencil or scriber and will act as a spacing gauge in accordance with the principles of this invention;

FIGURE 7 is a fragmentary view partly in vertical section and partly in elevation showing the manner in which the attachment of FIGURE 6 is applied to a lead pencil in accordance with the purposes of this invention;

FIGURE 8 is a horizontal sectional view taken substantially upon a plane indicated by section line 8—8 of FIGURE 7;

FIGURE 9 is a plan view illustrating the manner in which the implement of this invention is employed to produce a line of a multiple thickness;

FIGURE 10 is a view similar to FIGURE 1 but showing the manner in which the implement of FIGURE 1 is utilized to form spaced lines of a predetermined spacing and of varying thickness;

FIGURE 11 is a plan view showing the manner in which the implement of this invention is utilized to form broken or dotted lines in accordance with the invention;

FIGURE 12 is a vertical transverse sectional view taken substantially upon the plane indicated by section line 12—12 of FIGURE 11;

FIGURES 13 and 14 are views partly in elevation and partly in vertical transverse section showing the manner in which a gauge clip forming a part of the implement of FIGURE 1 is utilized to effect a variable precise spacing of lines;

Figure 15:
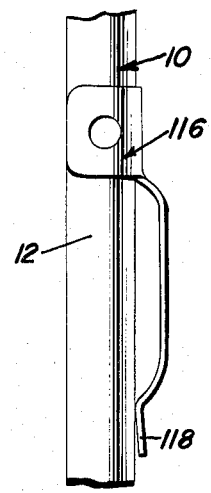
FIGURE 15 is a view in side elevation showing the mounting of the clip upon a marking implement.

Basically, the essence of this invention resides in providing a single drawing implement whether pen, pencil or scriber, capable of making various weight lines, rules or borders and whereby multiple lines or several lines may be drawn with regular spacing without moving the straight edge or T-square constituting the guide means for the implement.

The preferred embodiment carrying out the principles of the invention has as its main feature a gauge means consisting of a barrel in which is encased and from which protrudes the point of the drawing implement whether this point consists of a ball pen, a pencil point or other marking device with the barrel being polygonal in shape as for example having four sides and with the point located at a different distance from each of the sides so that by using a selected side a predetermined distance of the point from the side will result in the positioning of a line at a predetermined distance from the straightedge or other guide member.

A further feature of the implement is the provision of a clip secured to the barrel of the implement for a multiple purpose. The clip may be fashioned to hold the implement in the pocket of the user as an ordinary clip. However, it also serves as a means to place the implement in a horizontal position on the drawing surface and preventing rolling of the implement thereon. Still further, the clip is shiftable to a position on the implement whereby it acts as a stop and a set for further use of the clip as an aid to the drawing of a dotted line. Still further, the clip in a lower position upon the implement with multiple strokes draws wide or multiple parallel lines by turning the implements slightly on the radius of the clip. Solid lines with width varying from hairline to ⅛ of an inch or more may be obtained without lifting the implement from the writing surface.

A still further feature of the invention is the provision of a metal ball on the top of the implement, which, aside from being decorative, has the function of a burnishing instrument as it rolls on the surface to be burnished when pressure is applied.

Another important feature of the invention resides in the provision of a double series of knurls of a non-skid construction upon the barrel of the implement, one of which is used for regular drawing and the other or lower knurl being used as a grip when the clip is in the dotted line or wide line producing position.

Another feature of the invention is a refill cartridge whereby various weights, colors and types of ink, knives or scribers may be inserted in the same barrel of the implement.

A still further feature of the invention is that sides adapting the above described type of tip to a ball pen cartridge, may also be applied to mechanical pencils, to certain types of wet process drawing pens and a cap or jacket with this type of tip may be constructed to fit any universal type pen, pencil or drawing instrument. Further, ball pen cartridge tips may be constructed with the gauge means of this invention built thereinto.

When the implement is adapted to function as a scriber, as for scribing photographic films or other similar materials, it possesses the same features and advantages previously enumerated. The point is of hardened steel and blunt so that the actual cutting is done by the radius on the side of the metal and not by the actual point. The scriber cuts emulsion only and not the film over which the emulsion is applied.

Reference is now made first specifically to FIGURES 1-3 of the drawings. In FIGURE 1 there is shown a drafting implement indicated generally by the numeral 10 and shown in the form of a cylindrical barrel 12 of any suitable material forming a part of a ballpoint pen provided with a usual protective cap 14 frictionally engaged upon the ballpoint end of the same. As shown in FIGURE 2, the barrel is preferably hollow being provided with a bore 16 opening through the lower end of the barrel, the latter being externally beveled or tapered as at 18. The lower end of the bore 16 is internally threaded as at 20 for the reception of the diametrically enlarged correspondingly externally threaded cylindrical lower portion 22 of a ball pen type ink cartridge 24 which is thus detachably secured within the barrel of the implement, there being provided an annular flange or collar 26 adapted to engage and cover and seal the lower open end of the barrel 12.

Upon the exterior surface of the barrel adjacent its lower end there are provided two sets of longitudinally spaced knurled ribs, the upper set of knurling being indicated by the numeral 30 while the lower set is indicated at 32. Frictionally engaged upon the barrel is a shiftable clip which performs the customary function of acting as a retainer whereby the implement may be retained in the pocket of the user and for other useful purposes as set forth hereinafter. Indicated at 36 is a vent in the barrel 12 in a position to provide for the inlet of air into the bore 16 and thus serve to vent the interior of the ink cartridge 24 and facilitate the flow of ink therefrom.

The projecting end of the cartridge element 24 constitutes the essence of the present invention and as will be seen by a comparison of FIGURES 1 and 2 with FIGURE 3 comprises a body having a longitudinally extending shank portion 38. Adjacent its lower end the shank portion merges as by beveled surfaces 40 into a terminal portion 42 of smaller cross-sectional area. The cartridge 24 extending through the gauge element just described and which is indicated generally by the numeral 50 has a tip 52 by which a line may be drawn from the ink dispensed therefrom. The essence of this invention resides in the geometrical positioning of the ball tip 52 with respect to the periphery of the body 38.

The body 38 is polygonal in cross-section, having any desired number of plane sides. For convenience of illustration and for practical use a rectangular or square body 38 is found to be quite satisfactory, this body having four plane sides as indicated by the numerals 53, 54, 56 and 58. It will be observed from FIGURE 3 that the marking point 52 is disposed at a different distance from each of these sides and is so placed that the sides in succession are disposed at a precise predetermined increased distance from the point. In this manner, when a side is placed against the edge of a marking surface such as a straightedge or the like, was otherwise held in constant relation to a straightedge surface, the point will be positioned therefrom at a distance which is precisely known. By successively turning the gauging elements so that different guide surfaces of the series 53, 54, 56 and 58 are brought against the guiding straightedge or placed at a fixed distance with reference thereto, lines can be drawn which are spaced from each other or from the straightedge surface by a predetermined fixed increase in distance.

In the preferred form of the invention, the successive gauging surfaces 53, 54, 56 and 58 increase spacing of the point of the guide surface or straightedge surface by a distance each time which is sufficient to add another line thickness to the line already drawn. Thus single, double, triple or quadruple thickness or weights of line can be readily drawn by successively turning the implement in the hand without moving the guiding straightedge surface.

Preferably each side is provided with an indicating numeral as shown by the numerals 60 in FIGURES 1, 2 and 4. Each indicia therefore indicates whether the point is positioned with respect to the guiding surface of a straightedge to place a line in the closest position or in successively spaced positions therefrom.

It will be readily understood that by varying the number of guide surfaces upon the member 38, and by varying the successive degrees of spacing of the point from each of the guide surfaces, the various desired relative spacings of lines can be obtained for this implement. By employing for example the successive use of the surfaces 53 and 56 or 54 and 58, pairs of lines can be drawn very closely spaced with respect to each other. Alternatively, by employing an appropriate sense of surfaces, such as the surface 53 and then the surfaces 56 and 58, a single line can be drawn from the surface 53, with a double line spaced therefrom being drawn by the use of successive surfaces 56 and 58. Obviously, various other arrangements can be employed to thus produce different spacings of single or multiple lines and of the same or varying weights or widths.

Referring next to FIGURES 4 and 5 it will be seen that in place of the gauging member 50 used in conjunction with a ball pen cartridge there may be employed with the gauging member 50 a scriber rod 70 secured thereinto. The scriber rod 70 has a scribing end 72 tapered and terminates in a flat plane surface as at 74, see FIGURE 5. When this implement is employed on a photographic film or the like, the edge defined by the junction of the flat surface 74 with the periphery of the scriber scrapes or scores the emulsion on the film and does not cut the film itself. In this form of the invention the implement may be likewise rotatably positioned about its longitudinal axis so as to produce the same system of lines of different weights or different spacings all in reference to a single guiding straightedge surface.

Referring now to FIGURES 6, 7 and 8 it will be observed that the principles of the invention may also be utilized by somewhat different construction. Thus, as indicated generally by the numeral 80 there is provided a sleeve-like attachment having a barrel 82 whose open upper end is provided with a reinforcing or stiffening rim 84 and which barrel is adapted to slide over and snugly embrace the lower end of a pencil 86 of any desired character having a point 88 thereon. As shown in FIGURES 6 and 7, the lower portion of the barrel 82 curves gently inwardly and downwardly towards its lower end and then terminates in a terminal portion which is polygonal shaped in cross-section such as being square or rectangular as indicated by the numeral 90. In the portion 90 there is a bore 92 through which the point 88 of the pencil 86 extends and which fixedly centers the pencil point with respect to the exterior surface of the portion 90.

As in the preceding embodiments, the latter has a plurality of planar gauge or guiding surfaces 94 and the opening for the point is spaced at different distances from each of the guiding surfaces in the same manner as indicated in connection with FIGURES 3 and 5 so that on rotating the pencil with the attachment 80 fixed thereto the pencil point may be positioned at progressively and precisely varying distances from a straightedge guide surface against which one of the gauging surfaces 94 is positioned. Thus, by this attachment an ordinary pencil either of the mechanical pencil type or of the conventional wooden pencil may be adapted to produce a system of multiple lines in the same manner as in the preceding embodiment.

In FIGURE 9 there is illustrated the manner in which the implements of FIGURES 1–8 may be utilized to provide or produce a line having any desired weight. Thus, the numeral 100 designates a straightedge or other guide surface with which the implement 10 is adapted to be employed. The implement is placed so that one of the gauging surfaces of the member 38 is placed against the straightedge 100. By starting with the gauging surface 53 which carries the numeral 1 thereon, a line 102 is produced in a first position which is that most closely adjacent to the straightedge. Upon turning the implement until the gauge surface 2 is resting against the straightedge, the next successively spaced line 104 is produced which as will be noted overlaps line 102 to thus produce a line 104 of double thickness. In turn the gauge surface 56 carrying the numeral 3 is employed thus producing a further line 106, while finally when using the gauge surface 4 carrying the numeral 58, a fourth thickness or spacing of line 108 is employed.

Referring to FIGURE 10 it will be seen that by using the gauge surface 1, the line 102 is produced and by then changing to the gauge surface 3 a line 106 is produced and finally with the gauge surface 4, line 108 is produced. Thus the line 102 is spaced from the double thickness of the lines 106 and 108.

A further important use of the invention is illustrated in FIGURES 11 and 12. Here, a straightedge of any suitable character indicated by the numeral 110 has a serrated or notched strip 112 upon the top surface adjacent one edge thereof. The previously described clip 34 is now slid down along the barrel of the pen until it is engaged in the lowermost knurled portions 32. In this position, as shown in FIGURE 12, the clip will rest upon the notched portion 112 so that when the pen is drawn along the straightedge, the point will be lifted and lowered each time the clip passes over one of the serrations. This will result in the point producing the dotted line or broken line indicated by the numeral 114. Obviously, this dotted line 114 is subject to the same variations as to position, as to weight and as to multiple line spacings as was described in connection with the preceding portion of the specification.

Shown in FIGURES 13 and 14 is a further use of a clip indicated generally by the numeral 116. This clip at its lower end has a flat engaging blade 118 of any desired and predetermined thickness which when the clip is in its lowered position is adapted to rest against the gauge body 50 of the implement. When the clip is in the position shown in FIGURE 13, it is ineffective to effect the spacing of the line drawn by the implement with respect to the straightedge 100 or 110. Thus, the line thus drawn is spaced from the straightedge by a distance indicated at 120 which depends upon which one of the plurality of gauging surfaces on the spacer or gauge body 50 is employed. However, when the instrument is rotated to the position shown in FIGURE 14, with the spacing blade 118 thereof being placed between the portion 50 and the straightedge 100, the line thus produced is spaced at an increased distance from the straightedge as indicated at 122, this increase being the amount of the spacer blade 118 as modified by any change in the rotational position of the implement as by changing its gauging surfaces which are placed against the straightedge.

Figure 16:
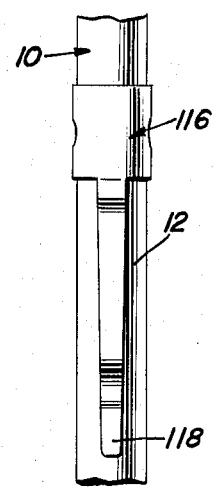
FIGURE 16 is a view at right angles from the right side of FIGURE 15.

FIGURES 15 and 16 show the form of clip 116 applied to the implement 10 but raised above the upper portion of the barrel 12 and above the two sets of knurls 30 and 32 in order to function as a retainer clip for the implement in the pocket of the wearer. In this position, also, the clip will serve to prevent rotation of the implement upon a drawing board or the like.

Figure 19:
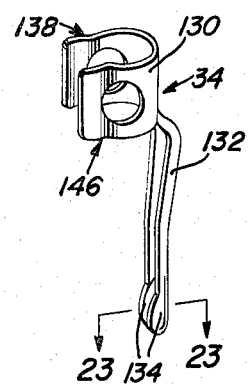
FIGURE 19 is a perspective view of a preferred form of a combined clip and marking gauge in accordance with this invention.
Figure 22:
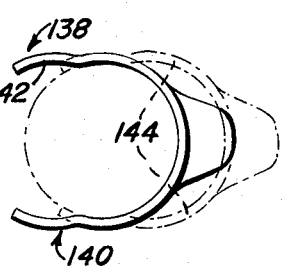
FIGURE 22 is a somewhat diagrammatic view showing in top plan the manner in which the clip of FIGURE 19 is adjustably secured to and positioned upon a marking implement.
Figure 23:
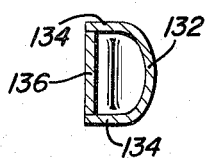
FIGURE 23 is a horizontal sectional view taken substantially upon the plane indicated by section line 23—23 of FIGURE 19.

Reference is now made to FIGURES 19, 22 and 23 for a better understanding of the novel construction of the clip 34. This clip includes a U-shaped band or strip 130 comprising a clip frictionally embracing the barrel of the implement. From this portion depends an arm 132 which in cross section is U-shaped and which at its lower end terminates in curved enlargements 134. Conveniently, the space between the two enlargements may be closed in as by a flange 136 to provide a flat wall at this point. Referring now to FIGURE 22 it will be observed that the U-shaped strap portion 130 has its two legs 138 and 140 each struck upon two different arcs. Thus, each of the legs has an outer arc indicated by numeral 142 and an inner arc 144. The arrangement is such that the clip may be caused to embrace the barrel 12 by either of these two arcs as shown in full and dotted lines in FIGURE 22. In this manner the depending arm 132 and the lower portion thereof can be either moved into contact with the gauging element 50 as shown in FIGURE 12 or may be spaced therefrom.

Figure 20:
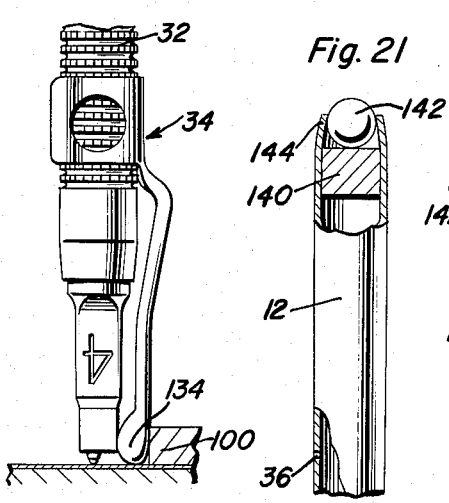
FIGURE 20 is a view in elevation showing the clip of FIGURE 19 as applied to a marking implement of the character shown in FIGURE 1.

The lower position of the clip 34 upon the implement is shown in FIGURE 20 wherein it will be noted that the enlarged portions 134 engaging against the adjacent surface of the straight edge 100 or 110 previously mentioned, will position the point at a further distance therefrom in the manner explained in connection with FIGURES 13 and 14.

Figure 21:
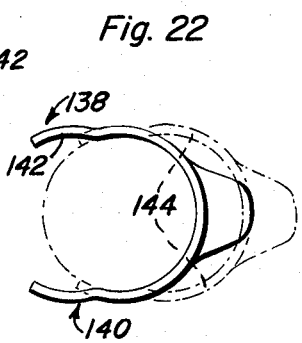
FIGURE 21 is a view partly in elevation and partly in vertical section of a further attachment constituting a part of this invention.

Referring now to FIGURE 21 it will be noted that the upper end of the barrel has the previously mentioned vent opening 36 therein. At its extreme upper end, however, the barrel is opened and has a filler block 141 fixedly secured thereinto in any desired manner spaced inwardly from the open end of the barrel and a ball 143 is received at the open end of the barrel abutting against the filler block and being retained by the inwardly flaring extremity 145 of the barrel. The projecting portion of the ball thus constitutes a burnishing implement whereby it may be run over a surface so as to provide a burnished effect therefore.

Figure 24:
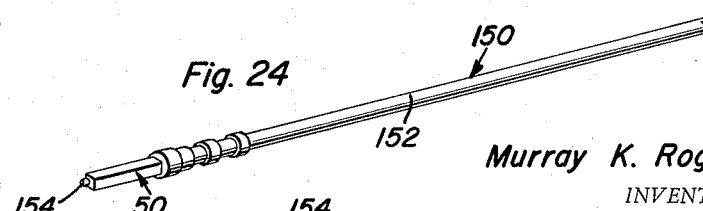
FIGURE 24 is a perspective view of a throw-away or replaceable cartridge and ball pen element incorporating therein the principles of this invention.
Figure 25:
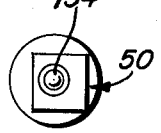
FIGURE 25 is an end elevational view of the end of the marking element of the cartridge of FIGURE 24.

Indicated in FIGURES 24 and 25 is a further adaptation of the implement indicated generally by the numeral 150 which is in the form of a replacement cartridge for a ball pen of any conventional type. This cartridge includes the usual barrel 152 containing the ink supply, and integrally formed upon the lower end of the barrel or else separately formed and rigidly attached thereto is the gauging element 50 in accordance with this invention and through which projects the point or ball 154 of the ball pen. As in the preceding forms, this gauge element has a plurality of gauging surfaces disposed in polygonal shape thereabout with the ball point 154 being disposed at a selected different distance for each of the gauging surfaces so as to produce the desired spacing of the lines produced by the implement.

The operation of this form of the invention is identical to that previously described except that the entire unit 150 is adapted to be thrown away when the ink supply of the cartridge is exhausted.

Figure 17:
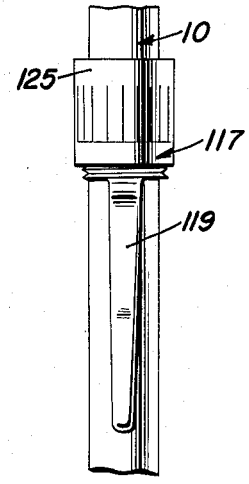
FIGURE 17 is a view similar to FIGURE 16 but of a modified construction of the mounting of a retaining engaging clip for an implement.
Figure 18:
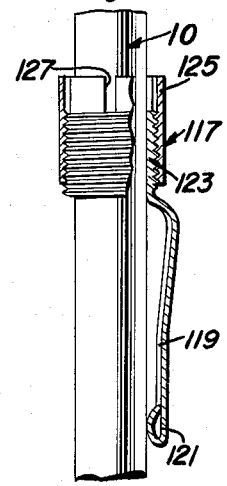
FIGURE 18 is a view similar to FIGURE 17 but with parts broken away and shown in vertical section of the device of FIGURE 17.

FIGURES 17 and 18 disclose a slightly modified form of slidable clip from that of FIGURES 15 and 16. Here the clip assembly 117 has a blade 119 with an inturned bend 121 at its lower end while its upper end consists of a band or annulus 123 externally threaded to receive the internally threaded sleeve 125 which is longitudinally slotted at 127 for a resilient gripping action, the operation of this form is identical with that of the other form of clips.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A draftsman's implement for producing upon a surface multiple lines which are uniformly spaced from each other throughout their length but at a selectively varied distance from each other and comprising an elongated barrel, a marker point projecting axially from one end of said barrel and having a central longitudinal axis, a plurality of angularly related planar gauge surfaces upon the exterior surface of said barrel at said one end and disposed in circumferentially spaced positions about said longitudinal axis and at different distances from the latter, said gauge surfaces being so arranged that when they are selectively engaged with a guiding surface for sliding linear movement thereon, said marker point will produce lines of uniform spacings but at different distances from said guide surface, a clip movably mounted on said barrel, said clip including a gauge spacer blade movable into side by side engagement with said gauge element, said clip having a U-shaped bracket with spaced arms for embracing said barrel, said arms having laterally spaced recesses therein for engaging said clip on said barrel in laterally spaced positions.

2. The combination of claim 1 wherein said clip has a depending leg of U-shaped cross section whose lower end is laterally thickened.

3. A draftsman's implement for producing upon a surface multiple lines which are uniformly spaced from each other throughout their length but at a selectively varied distance from each other and comprising an elongated barrel, a marker point projecting axially from one end of said barrel and having a central longitudinal axis, a plurality of angularly related planar gauge surfaces upon the exterior surface of said barrel at said one end and disposed in circumferentially spaced positions about said longitudinal axis and at different distances from the latter, said gauge surfaces being arranged that when they are selectively engaged with a guiding surface for sliding linear movement thereon, said marker point will produce lines of uniform spacings but at different distances from said guide surface, said barrel having longitudinally spaced knurled portions thereon, a clip slidably received on said barrel and selectively engaged upon said knurled portions, said clip including a gauge blade engageable selectively with said gauge surfaces.

4. A draftsman's implement for producing upon a surface multiple lines which are uniformly spaced from each other throughout their length but at a selectively varied distance from each other and comprising an elongated barrel, a marker point projecting axially from one end of said barrel and having a central longitudinal axis, a plurality of angularly related planar gauge surfaces upon the exterior surface of said barrel at said one end and disposed in circumferentially spaced positions about said longitudinal axis and at different distances from the latter, said gauge surfaces being so arranged that when they are selectively engaged with a guiding surface for sliding linear movement thereon, said marker point will produce lines of uniform spacings but at different distances from said guide surface, a clip slidably mounted upon said barrel for movement towards and from said marker point, said clip having a portion thereof constituting a gauge spacer blade, said spacer blade being positionable against one of said gauge surfaces upon movement of said clip towards said marker point whereby when said gauge blade is engaged with a guide surface, the longitudinal axis of said marker point will be displaced from said guide surface by an amount equal to the thickness of said spacer blade plus the distance of the associated gauge surface from said longitudinal axis.

5. A draftsman's implement for producing upon a surface multiple lines which are uniformly spaced from each other throughout their length but at a selectively varied distance from each other and comprising an elongated barrel, a marker point projecting axially from one end of said barrel and having a central longitudinal axis, a plurality of angularly related planar gauge surfaces upon the exterior surface of said barrel at said one end and disposed in circumferentially spaced positions about said longitudinal axis and at different distances from the latter, said gauge surfaces being so arranged that when they are selectively engaged with a guiding surface for sliding linear movement thereon, said marker point will produce lines of uniform spacings but at different distances from said guide surface, a clip mounted on said barrel for sliding movement toward and from said marker point, said clip having a horizontal surface cooperating with a broken or serrated horizontal surface on a straight edge or similar guide for effecting vertical movement of said marker point for producing broken lines.

6. A draftsman's implement for producing upon a surface multiple lines which are uniformly spaced from each other throughout their length but at a selectively varied distance from each other and comprising an elongated barrel, a marker point projecting axially from one end of said barrel and having a central longitudinal axis, a plurality of angularly related planar gauge surfaces upon the exterior surface of said barrel at said one end and disposed in circumferentially spaced positions about said longitudinal axis and at different distances from the latter, said gauge surfaces being so arranged that when they are selectively engaged with a guiding surface for sliding linear movement thereon, said marker point will produce lines of uniform spacings but at different distances from said guide surface, a clip slidably mounted upon said barrel for movement towards and from said marker point, said clip having a portion thereof constituting a gauge spacer blade, said spacer blade being positionable against one of said gauge surfaces upon movement of said clip towards said marker point whereby when said gauge blade is engaged with a guide surface, the longitudinal axis of said marker point will be displaced from said guide surface by an amount equal to the thickness of said spacer blade plus the distance of the associated gauge surface from said longitudinal axis, said clip having a horizontal surface cooperating with a broken or serrated horizontal surface on a straight edge or similar guide for effecting vertical movement of said marker point for producing broken lines.

7. A draftsman's implement for producing upon a markable surface multiple lines which are uniformly spaced from each other throughout their entire length but at a selectively varied distance from each other and comprising an elongated barrel, a marker point projecting axially from one end of said barrel and having a central longitudinal axis, a plurality of angularly related planar gauge surfaces each disposed entirely upon the exterior surface of said barrel at said one end and disposed in circumferentially spaced positions about said longitudinal axis and at different distances from the latter, said gauge surfaces being so arranged that when they are selectively engaged with a guiding surface for sliding linear movement thereon, said marker point will produce lines of uniform spacings but at different distances from said guide surface.

8. A draftsman's implement for producing upon a markable surface multiple lines which are uniformly spaced from each other throughout their entire length but at a selectively varied distance from each other and comprising an elongated barrel, a marker point projecting axially from one end of said barrel and having a central longitudinal axis, a plurality of angularly related planar gauge surfaces each disposed entirely upon the exterior surface of said barrel at said one end and disposed in circumferentially spaced positions about said longitudinal axis and at different distances from the latter, said gauge surfaces being so arranged that when they are selectively engaged with a guiding surface for sliding linear movement thereon, said marker point will produce lines of uniform spacings but at different distances from said guide surface, circumferentially successive gauge surfaces being disposed at successive and progressively varying distances from said axis.

9. A draftsman's implement for producing upon a markable surface multiple lines which are uniformly spaced from each other throughout their entire length but at a selectively varied distance from each other and comprising an elongated barrel, a marker point projecting axially from one end of said barrel and having a central longitudinal axis, a plurality of angularly related planar gauge surfaces each disposed entirely upon the exterior surface of said barrel at said one end and disposed in circumferentially spaced positions about said longitudinal axis and at different distances from the latter, said gauge surfaces being so arranged that when they are selectively engaged with a guiding surface for sliding linear movement thereon, said marker point will produce lines of uniform spacings but at different distances from said guide surface, at least some of adjacent gauge surfaces being spaced from said axis at distances sufficient for producing overlapping lines upon said markable surface by said point whereby to produce a thickened line.

10. A draftsman's implement for producing upon a surface multiple lines which are uniformly spaced from each other throughout their length but at a selectively varied distance from each other and comprising an elongated barrel, a marker point projecting axially from one end of said barrel and having a central longitudinal axis, a plurality of angularly related planar gauge surfaces upon the exterior surface of said barrel at said one end and disposed in circumferentially spaced positions about said longitudinal axis and at different distances from the latter, said gauge surfaces being so arranged that when they are selectively engaged with a guiding surface for sliding linear movement thereon, said marker point will produce lines of uniform spacings but at different distances from said guide surface, said marker point having a cooperating screw-threaded engagement with said barrel at said one end of the latter.

11. A draftsman's implement for producing upon a surface multiple lines which are uniformly spaced from each other throughout their length but at a selectively varied distance from each other and comprising an elongated barrel, a marker point projecting axially from one end of said barrel and having a central longitudinal axis, a plurality of angularly related planar gauge surfaces upon the exterior surface of said barrel at said one end and disposed in circumferentially spaced positions about said longitudinal axis and at different distances from the latter, said gauge surfaces being so arranged that when they are selectively engaged with a guiding surface for sliding linear movement thereon, said marker point will produce lines of uniform spacings but at different distances from said guide surface, said implement including a recess in said one end of said barrel, said marker point being received in said recess and with said marker point projecting therefrom to the exterior of said barrel, means retaining said marker point within said recess.

12. For use with a line guide of the type having an exterior edge with a vertical, peripherally extending guide surface disposed entirely upon said exterior edge, a draftsman's implement for producing upon a horizontal markable surface multiple lines each uniformly spaced throughout its entire length from said guide surface but at selectively varied distances from each other, said implement comprising a vertically elongated barrel, a marker point projecting from one end of said barrel and having a longitudinal, generally vertical axis, a plurality of angularly related, intersecting planar gauge surfaces upon the exterior of said barrel at said one end and disposed in circumferentially spaced and generally parallel positions about said longitudinal axis but at different distances therefrom, each gauge surface being complementary to said guide surface for area contact therewith and sliding movement therealong throughout the entire length of said guide surface whereby when different selected gauge surfaces are engaged with and slid along said guide surface, said marker point will produce on said horizontal markable surface lines at different distances from said guide surface but with each line uniformly spaced throughout its length from said guide surface.

13. A draftsman's implement for successively producing upon a markable surface a plurality of lines which are uniformly spaced throughout their entire length from a guide surface but at selectively varied distances therefrom, said implement comprising an elongated barrel with a marker point projecting axially from one end thereof, the entire exterior circumferential surface of said barrel adjacent said one end being a polygonal shaped guide surface whose entire area constitutes selective gauge surfaces independently applicable to an slidingly engageable with a guide surface, said polygonal shaped guide surface comprising a plurality of angularly related adjoining planar guide surfaces, said marker point having a central longitudinal axis which is parallel to each planar guide surface and is disposed at a different distance from each.

14. A draftsman's implement comprising an elongated barrel, a marker point supported by and projecting axially from one end of said barrel and having a central longitudinal axis, said barrel at said one end having an exterior peripheral surface of polygonal shape consisting of a circumferentially continuous series of adjoining and angularly related planar gauge surfaces, said gauge surfaces being generally parallel to and spaced at different distances from the central longitudinal axis of said marker point, said gauge surfaces being of substantially equal circumferential extent about said barrel.

References Cited by the Examiner

UNITED STATES PATENTS

| | | | |
|---|---|---|---|
| 519,155 | 5/1894 | Haug et al. | 33—39 X |
| 924,877 | 6/1909 | Banfill | 33—174 |
| 1,213,134 | 1/1917 | Fellows | 33—148 |
| 1,246,405 | 11/1917 | Engelbrecht | 33—39 |
| 1,710,414 | 4/1929 | Falletta | 33—41 |
| 2,017,737 | 10/1935 | Smith | 33—27 |
| 2,212,703 | 8/1940 | Suffich. | |
| 2,514,003 | 7/1950 | Martin | 33—41 |
| 2,561,585 | 7/1951 | McKillop. | |
| 2,663,936 | 12/1953 | Lepkowski | 33—27 |
| 2,716,287 | 8/1955 | Hilstrom | 33—174 |
| 2,717,013 | 9/1955 | Van Zwalenburg | 33—41 |
| 2,718,708 | 9/1955 | Kalberer | 33—189 |
| 2,893,109 | 7/1959 | Young | 33—1 X |

ISAAC LISANN, *Primary Examiner.*

ROBERT L. EVANS, *Examiner.*